(No Model.)
D. WILLEY.
SAW SHARPENING DEVICE.
No. 304,388. Patented Sept. 2, 1884.
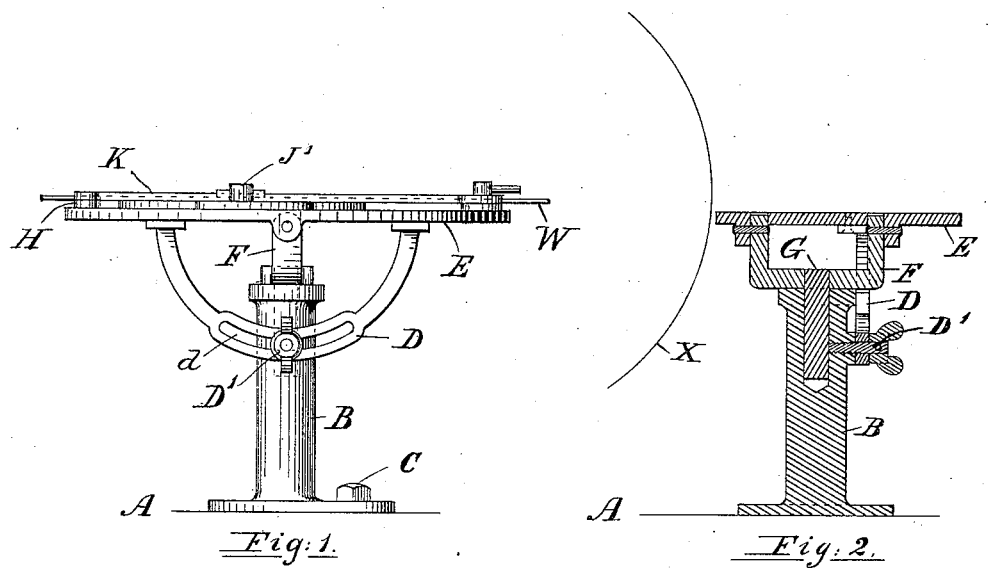
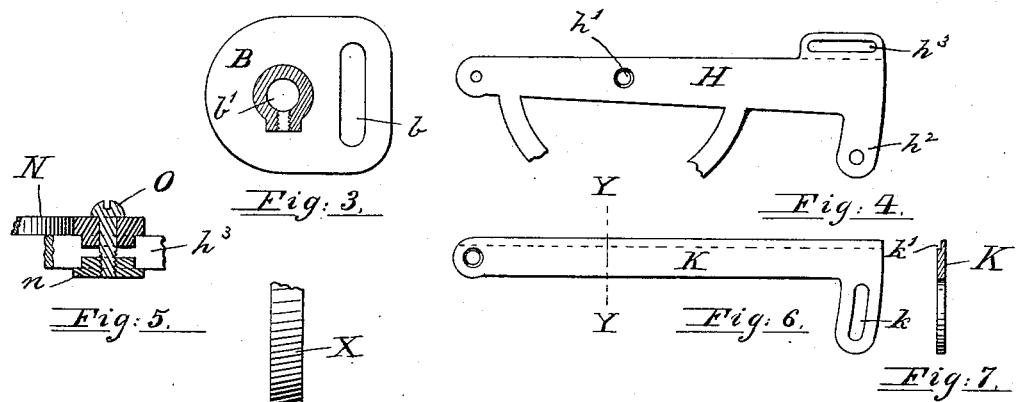
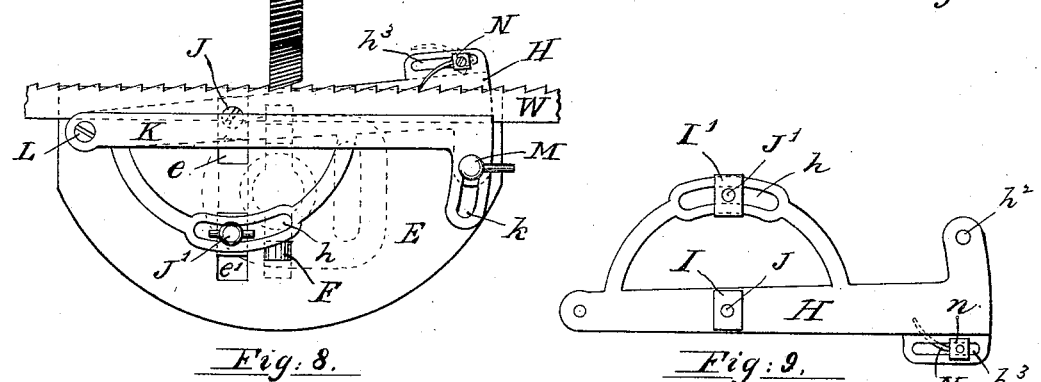
Witnesses,
H. M. Davis
F. A. Merrill
Inventor.
D. Willey
per J. B. Thurston
Attorney.

UNITED STATES PATENT OFFICE.

DANFORD WILLEY, OF CONCORD, NEW HAMPSHIRE.

SAW-SHARPENING DEVICE.

SPECIFICATION forming part of Letters Patent No. 304,388, dated September 2, 1884.

Application filed January 30, 1884. (No model.)

*To all whom it may concern:*

Be it known that I, DANFORD WILLEY, a resident of Concord, in the county of Merrimac and State of New Hampshire, have invented a certain new and useful Machine for Sharpening Band-Saws, of which the following is the specification, the object of this invention being to sharpen saws more rapidly than it can possibly be accomplished by filing, and at the same time to leave the teeth of uniform length and depth.

Reference may be had to the accompanying drawings, forming part of this specification, in which similar letters of reference indicate corresponding parts in all the figures, of which—

Figure 1 represents a front elevation of my machine complete. Fig. 2 is a central vertical section of the machine with the device for holding a band-saw removed. Fig. 3 is a sectional plan view of the stand, showing a slot in its base. Fig. 4 is a detail plan view of the shoe, or that part of my machine upon which a band-saw will rest, having a portion of the arc by which it is held at any required angle broken away. Fig. 5 is a detail view of a spring which acts as a gage while feeding the teeth of a saw into an emery-wheel, and is shown in part section to better illustrate its construction. Fig. 6 is a detached plan view of the back rest or clamp, which may accommodate itself to different widths of saws while holding them down upon the shoe. Fig. 7 is a cross-section of the same, taken at Y Y. Fig. 8 is a plan view of the entire machine, showing a section of a band-saw thereon and a section of an emery-wheel in position ready for use. Fig. 9 is an inverted plan view of the shoe, or that part of my machine shown in Fig. 4, having in position the rectangular blocks, which may be moved to and fro in slots formed for their reception in the table.

The line A represents the top of a bench or table, upon which the cast-iron stand B may be secured by the cap-screw C, which will pass through the slot $b$ and into the said bench A. The semicircular piece or arc D is screwed to the bottom of the table E for the purpose of holding the table at any required angle, this being accomplished by the slot $d$ in the arc D and the thumb-screw D', said table E being supported by and pivoted to the yoke F', into which one end of the stud G is rigidly fixed, said stud being made to fit a hole, $b'$, bored in the top of the stand B.

The shoe H is provided with an arc having a slot, $h$, the radial center of said arc being represented by the hole $h'$ in said shoe.

The rectangular blocks I I' are fitted to and slide in the slots $e\ e'$, formed in the table E, and are so fastened to the shoe H by the screws J J' as to enable said shoe to be placed at any angle necessary to give a required pitch to the teeth of a saw, W—*i. e.*, said shoe being swiveled by the screw J to the block I, and held in any position required by means of the screw J', passing through the slot $h$ and threaded to the block I'. A back rest, K, is pivoted at one end to one end of the shoe H by the screw L, the other being held down by the screw M, which passes through the slot $k$, and is threaded to a projecting ear, $h^2$, upon the said shoe H. Some suitable spring-gage, N, is provided, which may be moved to or from an emery-wheel, X, in a slot, $h^3$, provided in the shoe H for this purpose, and set or clamped, as is shown best in Fig. 5, at any given point required for a certain number of saw-teeth of a given length, by a screw, O, which is threaded to a sliding nut, $n$, fitted in the bottom of said slot $h^3$. The saw W, while bearing against the back rest, K, will be permitted to pass three-sixteenths of an inch (more or less) under said rest by means of the groove $k'$, which is shown in the cross-section view, Fig. 7, and thus be kept down upon the shoe H while being sharpened.

In Fig. 8 the spring-gage N is also shown in dotted lines turned out or away from contact with the teeth of a saw, and this will frequently occur when it is desired to sharpen a saw having teeth of very irregular or uneven lengths.

It may be here noted that as the shoe H, the rectangular blocks I I', with their screws J J', the back rest, K, and spring-gage N are all connected together, but are in no way fastened to the table E, this whole mechanism can be lifted from said table and laid aside, and the flat even surface of the table E be utilized for the purpose of sharpening any ordinary hand-saws which are too wide to be placed upon the mechanism designed especially for band-saws.

The slots $e\ e'$ in the table E are made half an inch (more or less) longer than are the rectangular blocks I I′, or, in other words, the travel given to said blocks is equal to the maximum depth of saw-teeth likely to be cut. Therefore, when preparing to sharpen a saw, the thumb-screw M should be loosened, the back rest, K, moved as far as need be away from the wheel, and the saw placed upon the shoe H, (said shoe having been previously shoved its extreme limit toward the emery-wheel,) having one of its teeth bearing against said emery-wheel. Then the back rest, K, may be moved forward against the saw, and the shoe H turned upon the table E, as may be required to give the necessary pitch or form to the teeth, and secured in this position by means of the slot $h$ and screw J′. The shoe should then be drawn back and the back rest moved farther toward the wheel (carrying the saw also) a short distance—say one-sixteenth of an inch. This last movement of the back rest, K, determines the amount to be ground from the saw, and after setting the emery-wheel in motion and pushing the shoe as far forward as possible it will be seen that the saw-tooth in contact with the wheel has been ground off an amount equal to the distance which the back-rest has been moved toward the wheel, and this operation is repeated for each succeeding tooth.

The slots $e\ e'$ may be thrown into one with equally as good results, and one rectangular block may then be used in place of the blocks I I′.

I have found by experience that saw-teeth which have been cut or sharpened upon an emery-wheel invariably cut more free and leave the board much smoother than will those which have been filed. Of the causes which bring about this result I will mention the two most prominent ones: First, by the use of an emery-wheel the teeth of a saw are cut slightly concave, but if filed by hand in the ordinary manner it is only an expert man who can file them tolerably flat, while a man not so expert in the use of a file would be very liable to leave the teeth slightly convex; and, second, by the use of an emery-wheel in connection with the mechanism before described the teeth must necessarily be perfectly even as to depth and length. Circular saws may also be sharpened upon the table E by removing the swiveled shoe H with its connecting parts.

Having thus fully described my invention, what I claim, and desire to secure by Letters Patent of the United States, is—

The swivel piece or shoe H, provided with an adjustable spring-gage, N, constructed substantially as described, carrying a back rest, K, rectangular blocks I I′, and screws J J′, in combination with a tilting table having slots $e\ e'$, all operating in the manner and for the purpose specified.

DANFORD WILLEY.

Witnesses:
J. L. STANYAN,
FRANK A. MERRILL.